(12) United States Patent
Brown et al.

(10) Patent No.: US 6,760,419 B1
(45) Date of Patent: Jul. 6, 2004

(54) METHOD AND APPARATUS FOR INTERFACING A DRIVE-THRU INTERCOM SYSTEM WITH A TELEPHONE SYSTEM

(75) Inventors: Michael E. Brown, Kings Mills, OH (US); Kenneth J. Rensing, Fairfield, OH (US)

(73) Assignee: E. F. Bavis & Associates, Inc., Maineville, OH (US)

( * ) Notice: Subject to any disclaimer, the term of this patent is extended or adjusted under 35 U.S.C. 154(b) by 678 days.

(21) Appl. No.: 09/689,024

(22) Filed: Oct. 12, 2000

(51) Int. Cl.$^7$ .......................... H04M 1/00; H04M 1/60; H04B 1/56; H04B 1/44
(52) U.S. Cl. ....................... 379/159; 379/160; 379/166; 379/167.04; 379/167.14; 370/276; 370/282
(58) Field of Search .................. 379/159, 160, 379/164, 165, 166, 167.04, 167.14, 399.01, 413.04, 194, 195, 198, 199; 370/276, 278, 282, 296, 359

(56) References Cited

U.S. PATENT DOCUMENTS

| | | | |
|---|---|---|---|
| 3,484,561 A | | 12/1969 | Matthews |
| 4,074,793 A | * | 2/1978 | Yuter ........................... 186/38 |
| 4,081,615 A | | 3/1978 | Hoehn |
| 4,485,273 A | | 11/1984 | Bartelink |
| 4,588,864 A | * | 5/1986 | Carter et al. ................. 379/157 |
| 4,731,821 A | * | 3/1988 | Jackson, III ................. 379/172 |
| 4,734,932 A | * | 3/1988 | Lott ............................. 379/160 |
| 4,744,103 A | * | 5/1988 | Dahlquist et al. ........... 379/247 |
| 4,754,476 A | | 6/1988 | Rasmussen et al. |
| 4,764,953 A | | 8/1988 | Chern et al. |
| 4,769,837 A | | 9/1988 | McCormick et al. |
| 4,893,334 A | | 1/1990 | Parnello |
| 4,943,997 A | | 7/1990 | Chang |
| 5,125,026 A | | 6/1992 | Holcombe |
| 5,151,935 A | * | 9/1992 | Slife et al. ................... 379/240 |
| 5,203,017 A | | 4/1993 | Brooks |

(List continued on next page.)

OTHER PUBLICATIONS

TIA/EIA–464B, *Requirements for Private Branch Exchange (PBX) Switching Equipment* (ANSI/TIA/EIA–464–B–96), Published Apr. 1, 1996, Committee TR–41.1, pp. 45 to 47, 9–18 to 9–21, definition page.

E&M Signaling Interface, Copyright 1989–1997 © Cisco Systems, Inc., pp. 1–4, printed Mar. 10, 2000, http://www-.cisco.com/univercd/cc/td/doc/product/wanbu/82/fpnm/fpugappg.htm.

*Primary Examiner*—Binh Tieu
(74) *Attorney, Agent, or Firm*—Dinsmore & Shohl LLP

(57) ABSTRACT

A method and system for interconnecting a telephone system and an intercom system. In one exemplary embodiment, telephone switchgear is connected to a telephone interface which provides separate voice transmit and receive channels. For example, an E&M tie line module can be utilized, which also includes E&M signaling connections for signaling an incoming intercom call to a telephone and for signaling an outgoing telephone call to an intercom. In this exemplary embodiment, an interface circuit is also provided to allow for signal level adjustment along the transmit and receive channels, such that the signal gain of the telephone system can differ from the signal gain of the intercom system. The interface circuit can include a controller which controls a switching device for selectively allowing communication along the transmit and receive channels during periods when communication is desired. In the embodiment, a dual tone multi frequency receiver can be utilized in conjunction with the controller to allow for remote control of the signal gain levels. The intercom system can include an exterior intercom station, such as found in the drive-thru lane of a business, with a mounted speaker and microphone to allow for hands-free communication by a customer. Other interior intercom stations may be connected, if desired, via an intercom switching device, which can communicate to the controller via a serial communication circuit.

27 Claims, 11 Drawing Sheets

U.S. PATENT DOCUMENTS

| | | |
|---|---|---|
| 5,220,677 A | 6/1993 | Brooks |
| 5,247,571 A | 9/1993 | Kay et al. |
| 5,321,848 A | 6/1994 | Miyahira et al. |
| 5,406,617 A * | 4/1995 | Bauer .................. 455/462 |
| 5,422,941 A | 6/1995 | Hasenauer et al. |
| 5,590,407 A | 12/1996 | Ishikawa et al. |
| 5,594,788 A | 1/1997 | Lin et al. |
| 5,598,456 A | 1/1997 | Feinberg |
| 5,644,630 A * | 7/1997 | Durco, Jr. ............ 379/159 |
| 5,666,428 A * | 9/1997 | Farinelli et al. ......... 381/81 |
| 5,761,320 A * | 6/1998 | Farinelli et al. ......... 381/81 |
| 5,784,446 A | 7/1998 | Stuart |
| 5,825,868 A * | 10/1998 | Diamond .............. 379/243 |
| 5,905,787 A | 5/1999 | Stuart |
| 5,917,899 A | 6/1999 | Moss et al. |
| 5,974,133 A | 10/1999 | Fleischer, III et al. |
| 6,026,375 A | 2/2000 | Hall et al. |
| 6,646,549 B2 * | 11/2003 | Dawson ................ 340/531 |

\* cited by examiner

METHOD AND APPARATUS FOR INTERFACING A DRIVE-THRU INTERCOM SYSTEM WITH A TELEPHONE SYSTEM

TECHNICAL FIELD

The present invention relates to interconnected telephone and intercom systems and, more particularly, in one embodiment, to a method and apparatus for connecting a telephone system with a full duplex intercom system using a tie line module and interface circuitry.

BACKGROUND OF THE INVENTION

Conventional drive-thru intercom systems, such as those used at banks, pharmacies, and fast food restaurants, require separate interior intercom stations or consoles within the facility. The drive-thru employee operator attends to this station and responds to calls made by customers from an automobile drive-thru lane exterior to the facility using an exterior intercom system. A typical interior intercom station includes a speaker and microphone which may be combined in a headset utilized by the employee in responding to the drive-thru orders. A typical exterior intercom station likewise includes a speaker and microphone, which are usually mounted in a stand or panel for hands-free operation by the customer.

With such conventional intercom systems, if it is desirable for the employee to be able to receive telephone calls, a separate telephone set and related circuitry are required. As can be understood, providing and maintaining two separate systems within the facility, one for telephone communication and one for intercom communication, requires the expense of purchasing and maintaining the separate equipment associated with the systems. Aside from the expense, the space required for two separate intercom and telephone stations imposes an inconvenience on the employee, who, with computers, registers, and other desk items, may have very limited space within which to work. Moreover, in order to implement both systems in wireless technology, problems may be encountered with conflicting carrier frequencies, requiring the expense and inconvenience of designing the two systems to operate without interference. In addition, as communication technology continues to develop rapidly, it would be desirable to periodically upgrade both systems to remain current with the latest features. However, as can be understood, upgrading both telephone and intercom equipment as technology develops, can be expensive and inconvenient. Finally, the use of two separate, telephone and intercom systems does not allow the customer to communicate to any employees who are not located at an intercom station.

Attempts have been made to integrate telephone and drive-thru intercom systems. However, such attempts have typically focused on the use of "voice-switched" or half duplex systems, wherein only one person may communicate at a time during the conversation. Such a system recognizes which party is talking and allows one-way communication for the duration of that party's statement. Accordingly, either the customer or the employee could talk using such a system, and not both parties simultaneously. However, such a conversation is not natural and can in fact cause certain statements to go unheard. For example, if the employee is speaking and the customer makes a comment during the employee's statement, the customer's comment will not be heard by the employee. Morever, a half-duplex system can clip the first syllable of speak while deciding which party is speaking and while switching between the parties. This is especially true in the drive-thru intercom scenario, where high levels of ambient noise (caused by automobiles and the like) make it difficult to quickly distinguish speech from background noise and conduct the switching. Lost statements and/or lost syllables during such a conversation can be problematic in communicating orders, instructions, and information between customer and employee. This is particularly true in the context of a drive-thru pharmacy, where mis-communication can result in the wrong prescription or instructions being delivered to the customer, potentially creating very undesirable results for the customer.

Integrating intercom and telephone systems can be especially difficult in a drive-thru environment. This is because the signal gains required in a drive-thru intercom are typically much higher than that of a telephone system. In particular, in a typical drive-thru intercom system, a microphone/speaker stand or panel is placed along a curb of a drive-thru lane. The customer in the automobile places an order by speaking from an automobile in the drive-thru lane. Higher gains are necessary due to the distance between the customer and the speaker/microphone (typically at least one foot or more), along with automobile noise and ambient noise exterior to the facility. Sound pressure varies as the inverse of the square of the distance between the person and the speaker/microphone. Accordingly, gains as high as three are sometimes necessary for the customer to satisfactorily hear the employee, and vice versa. With a telephone system, however, the receiver is typically close to the ear, and the transmitter is typically close to the mouth, allowing both the transmit and receive electrical paths to be connected together, and allowing for system gains of less than one.

Accordingly, it is desirable to integrate a telephone system with an intercom system to eliminate the expense, inconvenience, and space requirements associated with the use of separate telephone and intercom stations. Such an integrated system could also allow an upgrade of the telephone equipment to result in a simultaneous upgrade of the intercom equipment, thereby reducing maintenance expenses. Morever, such an integrated system can allow the customer using the intercom system to speak with any employee located near a telephone, including employees at remote locations, such as those at other offices or stores. It is also desirable to provide such an integrated system that does not clip the syllables of spoken words or otherwise lose statements made during the communication. In particular, an integrated telephone intercom system is desired that is full duplex with separate transmit and receive paths, and that allows for the higher gains needed on the intercom circuit.

SUMMARY OF THE INVENTION

Accordingly, it is an object of the present invention to obviate the above-described problems in utilizing telephone systems with intercom systems In particular, it is an object of at least one embodiment of the present invention to integrate a telephone system within a facility with an intercom system for communicating with individuals outside of the facility, such that separate intercom equipment is not required within the facility.

It is another object of at least one embodiment of the invention to effectively integrate a business telephone system with a drive-thru intercom system while maintaining high quality communication between the two systems.

Another object of at least one embodiment of the present invention is to provide full duplex communication between a telephone system and an intercom system.

A further object of at least one embodiment of the present invention is to integrate a telephone system with an intercom system, such that upgrades to a telephone receiver and transmitter simultaneously results in upgrades to an interior intercom station.

Yet another object of at least one embodiment of the present invention is to provide an integrated telephone and intercom system with reduces equipment and maintenance costs.

Another object of at least one embodiment of the present invention is to provide an integrated telephone and intercom system which allows a party at an intercom station and a party at a telephone station to communicate with one another and to speak simultaneously with both parties hearing all words spoken.

It is another object of at least one embodiment of the present invention to provide an integrated telephone and intercom system which does not truncate or otherwise fail to transmit words or syllables spoken.

Another object of at least one embodiment of the present invention is to provide a communication system which allows a customer in a drive-thru lane to communicate using a standard hands-free intercom station with one or more store employees who are using a standard telephone handset or headset, with full duplex communication between the parties.

Yet another object of at least one embodiment of the present invention is to integrate a hands-free drive-thru intercom station with a business telephone system with adequate signal gains within the intercom and telephone systems.

The above objects are provided merely as examples, and are not limiting nor do they define the present invention. Additional objects, advantages and other novel features of the invention will be set forth in part in the description that follows and will also become apparent to those skilled in the art upon consideration of the teachings of the invention.

To achieve the foregoing and other objects, and in accordance with the purposes of the present invention as described above, an integrated telephone and intercom system is provided in one embodiment, comprising a telephone station having a telephone transmitter and telephone receiver. Also included is a telephone interface in communication with the telephone station, and an intercom station including an intercom speaker and microphone. In addition, the system includes an interface circuit connecting the telephone interface with the intercom station. The interface circuit includes separate transmit and receive channels so as to provide full duplex communication between the telephone station and intercom station. The interface circuit can tie to intercom circuitry which communicates with the intercom station.

According to another aspect of the invention, a method of connecting a telephone system with an intercom system is provided. The method comprises accessing a PBX switching device and connecting a PBX interface device to the PBX switching device. The method also comprises connecting the PBX interface to an interface circuitry, accessing a full duplex drive-thru intercom station, and connecting the interface circuit to the intercom station.

According to another aspect, an interface circuit for connecting a telephone system with a drive-thru intercom system is provided. The circuit comprises a voice transmit channel for carrying voice signals from the telephone system to the intercom system, and a voice receiver channel for carrying voice signals from the intercom system to the telephone system. Also provided is a switching device located along at least one of the channels, and a gain adjustment circuit located along at least one channel. A control circuit is also provided which is in communication with the switching device, and configured to selectively apply signals to the switching device to selectively connect and disconnect a telephone system and an intercom system.

Still other objects of the present invention will become apparent to those skilled in this art from the following description wherein there is shown and described exemplary embodiments of this invention, simply for purposes of illustration, including a best mode currently contemplated for carrying out the invention. As will be realized, the invention is capable of other different, obvious aspects without departing from the scope of the invention. Accordingly, the drawings and descriptions are to be regarded as illustrative in nature and not as restrictive in nature.

BRIEF DESCRIPTION OF THE DRAWINGS

While the specification concludes with claims particularly pointing out and distinctly claiming the present invention, it is believed that the same will be better understood from the following description of exemplary embodiments taken in conjunction with the accompanying drawings in which:

DETAILED DESCRIPTION OF EXEMPLARY EMBODIMENTS

Figure 1:
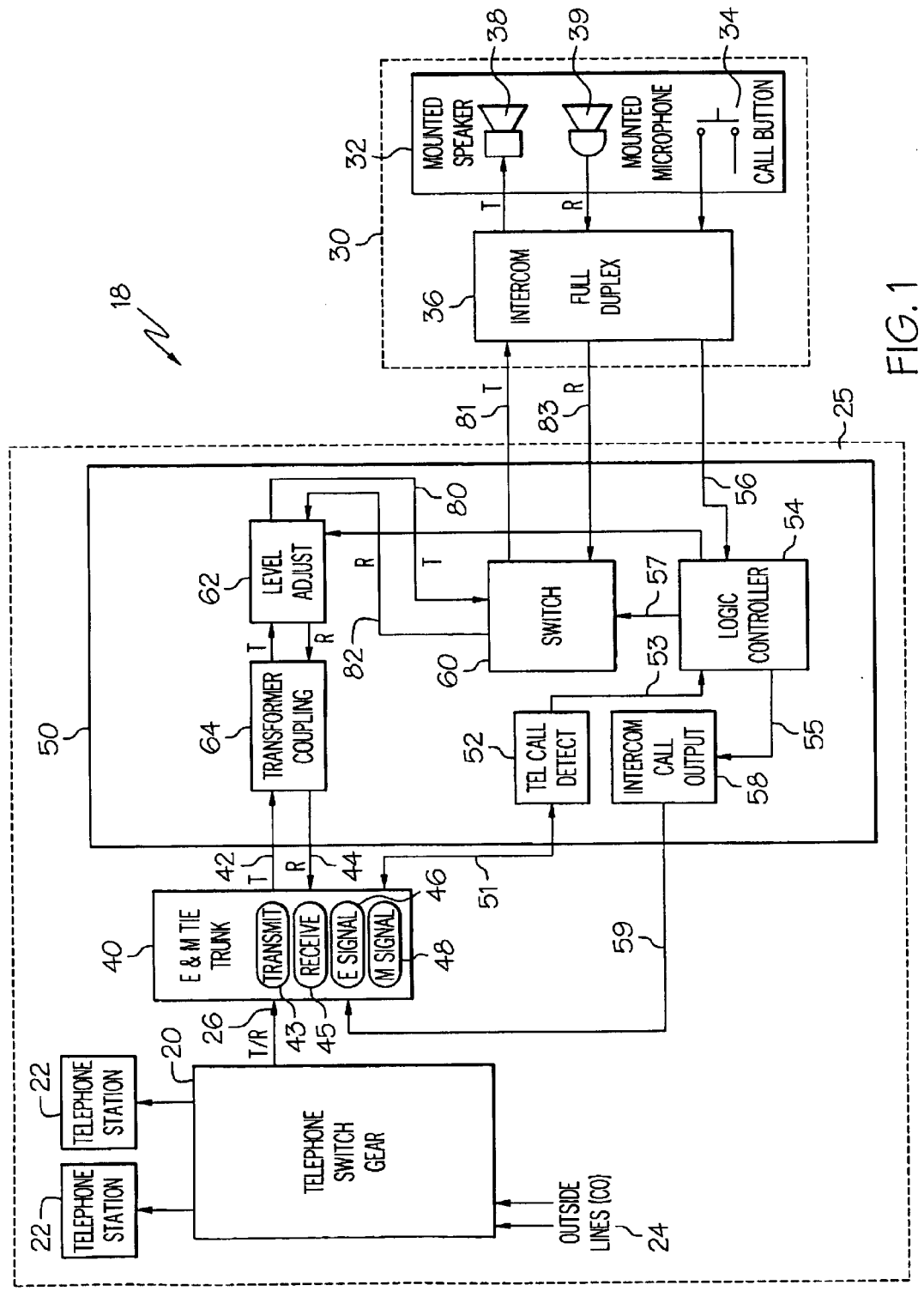
FIG. 1 is a block diagram of an interfaced telephone and drive-thru intercom system, made according to principles of the present invention.

FIG. 1 is a block diagram illustrating an exemplary embodiment of an integrated telephone and intercom system 18, built according to principles of the present invention. In general, the integrated system 18 includes telephone switch circuitry 20 and an intercom system 30 which are tied together by full duplex telephone interface 40 and interface circuitry 50. Accordingly, the system 18 allows a person, such as a customer exterior to facility 25, to use the intercom system 30 to communicate with another person, such as a store employee, who is using a telephone station 22 inside the facility. The full duplex telephone interface 40 can separate the transmit and receive paths of the telephone switch 20, such that these paths are not connected, and also provides signaling connection ports for initiating calls from either side of the system. The interface circuitry 50 makes the appropriate connections once calls are initiated to allow the communication, and can provide gain adjustment and signal isolation.

More specifically, the telephone stations 22 can comprise any desired telephone handset, headset units, and/or other communication units, such as telephone receivers and transmitters typically used in business or residential applications for instance. Such stations 22 may be wired or wireless and may utilize handset, headset, or speaker phone units. Numbered buttons can be provided to place calls to other telephone stations. Other buttons, displays, and indicators can also be provided to provide other desired features, such as for transferring calls, forwarding calls, placing conference calls, placing calls on hold, muting the transmitter, utilizing voicemail features, etc. The specific features of the station 22 depend on the features desired by the user, and suitable stations can be selected accordingly. Stations 22 are available from a variety of suppliers, including Nortel, Lucent, and NEC.

The stations 22 are tied to telephone switchgear circuitry 20, which can comprise suitable circuitry, paths, and/or devices (integrated and/or discrete) for tying the stations 22 with one another and with outside lines 24 from a central office (CO) telephone lines, such as those from a public telephone company. The stations 22 and telephone switchgear circuitry 20 preferably comprise a public branch exchange (PBX) telephone system, which allows stations 22 within a business or facility to easily contact each other and to utilize a variety of telephone communication features. The switchgear circuitry 20 allows for these internal telephone network communication connections and features, and also allows for outside calls to be placed and received via the CO lines 24. Accordingly, the telephone switchgear 20 preferably comprises PBX switchgear circuitry. Such circuitry is available from a number of suppliers, including Lucent Technologies, Nortel, NEC, and others, and can include appropriate control units, expansion units, power modules, processors, software or firmware, tip/ring modules, and/or other components, modules, and software.

On the intercom side, the intercom system (e.g., station) 30 includes communication devices 32 and full duplex intercom circuitry 36. The devices 32 include a speaker 38 (any audio output device or receiver) and a microphone (any audio input device or transmitter) 39 to allow the customer to communicate with an employee at a telephone station 22 within the facility 25. The devices 32 also preferably include a call input device such as a call button 34 to allow the customer to signal to the telephone stations 22.

Figure 10:
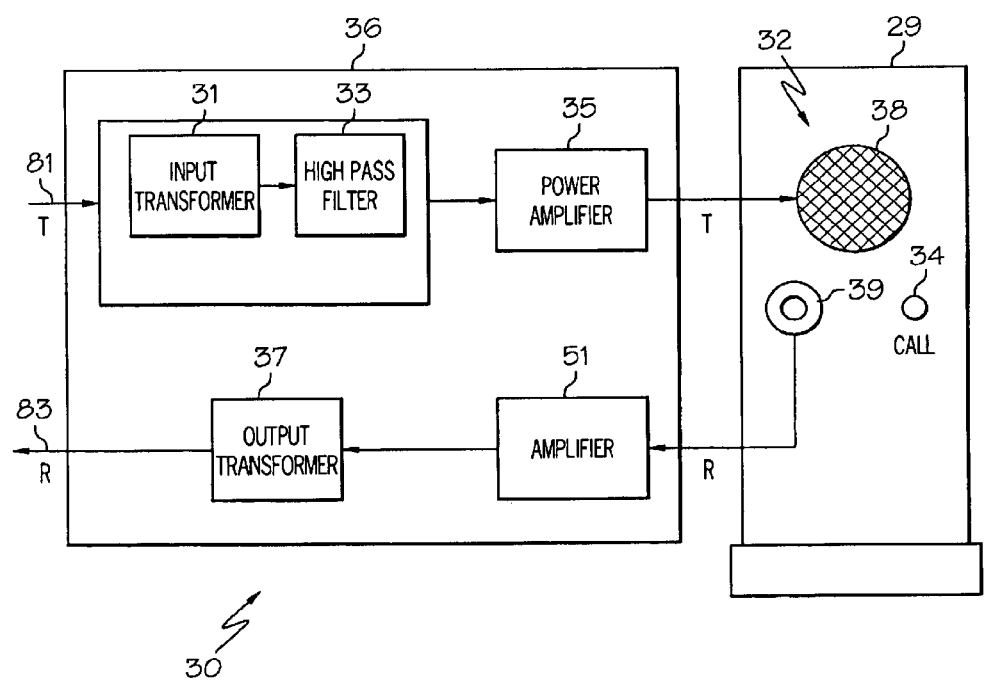
FIG. 10 is a block diagram illustrating an exemplary intercom system which can be utilized with embodiments of the present invention.

The circuitry 36 can include appropriate interface paths, components, and/or devices to transmit, receive, and/or condition signals which are sent to and from the devices 32. FIG. 10 illustrates exemplary devices which can be utilized for this purpose. In particular, the transmit signal from line 81 can be supplied to an input transformer 31 to receive and isolate the signal, which then passes the received signal to a filter 33. In the exemplary embodiment, the filter 33 is a high pass filter with a low end cutoff frequency of about 300 Hz, to eliminate noise, such as a 60 Hz noise signal which may be present from power connections. The output of the filter 33 can be provided to a power amplifier 35 which amplifies the signal to the proper level required by the speaker 38. Likewise, the output of the microphone 39 can be provided to an amplifier circuit 51, which then provides a suitable output signal to drive an output transformer 37.

In the example shown in FIG. 10, the intercom system 30 includes a fixed intercom station 29, such as a customer intercom box, pedestal, or panel, which provides a mounted speaker 38 and mounted microphone 39, which are positioned such that the customer can speak and hear from an automobile in a hands-free manner. In other words, the customer does not need to lift a handset or headset or otherwise move a speaker and/or microphone unit in order to utilize the station 29. It is also preferred that the intercom station 29 is an exterior intercom unit which includes a protective housing, such as the units typically utilized in drive-thru lanes of businesses, such as restaurants, banks, pharmacies etc. An exemplary station 29 is the BAVCOM intercom station, made by E. F. Bavis & Associates, Inc. Such systems can include pass-thru windows and/or conveyance systems to exchange money and goods between the parties. It is preferred that the intercom interface circuitry 36 is provided within such a protective station or housing and near the audio devices 32 to improve signal quality and reduce the possibility of noise. However, the location between components of embodiments described herein can be modified as desired for a particular application. Moreover, the type of communication channel (e.g., wired, wireless) between devices as well as the communication protocol utilized can be modified as desired and/or needed.

Returning again to FIG. 1, the full duplex telephone interface 40 communicates with the switchgear 20. Preferably, the full duplex telephone interface 40 receives one or more channels 26 from a trunk line from the switchgear 20 and separates transmit and receive signals into a separate transmit channel 42, and a separate receive channel 44. Accordingly, the full duplex telephone interface 40 preferably includes a transmit connection (or port) 43 and a receive connection 45, and can allow for full duplex communication. It is also preferred that the full duplex telephone interface 40 provides signaling conductors to allow for the intercom system 30 to signal the telephone stations 22, and vice versa.

In the exemplary embodiment of FIG. 1, the full duplex telephone interface 40 comprises an Ear and Mouth (E&M) tie trunk module, although other modules, circuits, devices, and/or cards which provide transmit and receive lines can be utilized. In addition to the transmit and receive lines, the exemplary E&M module of FIG. 1 includes an "E" (ear) signal connection 46 and an "M" (mouth) signal connection 48. The connection 46 allows the intercom devices 32 to signal or call the telephone station 22 to initiate communication. Conversely, the connection 48 allows the telephone station 22 to signal or call the intercom devices 32 to initiate communication. E&M tie trunk units are available from a variety of vendors to seamlessly connect various PBX trunk lines and/or PBX switchgear together to allow all calls between the systems to be handled as internal calls. In particular, an E&M module can transport separate transmit and receive voice channels between private branch exchanges (PBXs) and is ear-originated. The signaling channel detects the application of office battery voltage (e.g., −48 Vdc), causing a relay closure at the other end of the channel. This signals an "off-hook" condition that alerts the PBX to an incoming signal. The E&M interface typically uses an RJ-48C type connection, and can be programmed with special attenuation, gain and impedance settings that can conform to the specific attributes of different PBX systems.

Exemplary units are available as model PN850060 E&M module from PremNet, and as MERLIN MAGIX 400 E&M module from Lucent. If an E&M tie line module is utilized for the full duplex telephone interface 40, the specific unit chosen can depend upon the type of switchgear 20 which is utilized in the telephone system.

The interface circuitry 50 comprises connections, paths, devices, and/or electronic components, and receives signals from the full duplex telephone interface 40 and transmits the signals to the intercom system circuitry 30 by connecting the two systems. In the exemplary embodiment, the interface circuitry 50 recognizes signaling from the intercom devices 32 and the telephone stations 22, makes the appropriate connections once calls are initiated to allow the communication, and can provide gain adjustment and signal isolation.

More specifically, in this exemplary embodiment, a call can be initiated by a person at a telephone station 22. As known in the art, the switchgear 20 can be programmed in a way to generate a signal over channel 26 in response to a condition of one or more stations 22, such as in response to a button or buttons being pressed at the station, or to an "off the hook" condition of a station (e.g., lifting the headset). Such a signal from the switchgear 20 causes the E&M module 40 to present an "M" output signal at port 48. As shown in FIG. 1, the "M" output signal from the module 40 is provided to telephone call detection circuitry 52 within the interface circuitry 50. The output of the call detection circuitry 52 is then provided over line 53 to a logic controller 54, which can thereby recognize the presence or absence of a call initiated by a telephone station 22, and appropriately control switch circuitry 60 that interconnects the intercom system 30 with the tie line module 40. More specifically, the switch circuitry 60 connects and disconnects a transmit line (or channel) 80 with a transmit line 81 connected to the intercom system 30. Likewise, the switch circuitry 60 connects and disconnects receive line 82 with a receive line 83 connected to the intercom system 30. The transmit lines 80, 81 and the receive lines 82, 83 are independent communication channels, to provide full duplex communication. Appropriate switching is accomplished by the switch circuitry 60 under control of the logic controller 54.

To adjust the volume of the audio signals which are transmitted between the intercom and telephone systems, the transmit and receive lines 80 and 82 from the switch circuitry are connected to level adjustment circuitry 62. Accordingly, as some intercom systems may be situated in noisier environments than others, audio levels can be raised or lowered to appropriate levels for the particular intercom system 30. The transmit and receive lines are then connected from the level adjustment circuitry 62 through a transformer coupling circuitry 64 to the transmit and receive lines (42 and 44) from the E&M tie line module 40. The transformer coupling 64 is provided to isolate the signals between the full duplex telephone interface 40 and the intercom system 30, to prevent the possibility of any DC current bias or other mismatch between the two systems.

Accordingly, when a telephone station 22 initiates a call to the intercom system 30, a signal (i.e., a change in condition) is generated on the "M" connector of the E&M tie line module 40. This output is provided to the call detection circuitry 52 over channel 51, causing the call detection circuitry to signal the logic controller 54. The logic controller then provides a signal on line 55 to the intercom call output circuitry 58 to cause the generation of an "E" output signal to the E&M module. Moreover, the logic controller 54 is programmed to activate the switching circuitry 60 in response to the receipt of a signal from the call detect circuitry 52 and the generation of the output signal to the output circuitry 58. Accordingly, in such a condition, the microcontroller 54 will interconnect the transmit channel 81 from the intercom system 30 with the transmit channel 80 (which is interconnected, through the transformer coupling 64 and the level adjustment circuitry 62, to the transmit channel 42 from the E&M tie line module 40). In addition, the activation of the switching circuitry 60 by the controller 54 will also interconnect the receive channel 83 from the intercom system 30 with the receive channel 82 (which is interconnected, through the transformer coupling 64 and the level adjustment circuitry 62 to the receive channel 44 from the E&M tie line module 40.) Accordingly, the logic controller 54 causes the intercom system 30 to interconnect/connect (to be capable of communicating) with the E&M tie line module 40 when a call signal is detected on the M channel 51. Because the E&M tie line module 40 can communicate with the telephone switchgear 20 over channel 26, the interconnection by the switching circuitry 60 allows the telephone station 22 to be used for communication with the intercom devices 32.

Calls may also be initiated at the intercom station 32 which is equipped with a call button 34. When the call button 34 is pressed, a signal is provided over call channel 56 to the controller 54. Upon detection of the call signal on the call channel 56, the controller 54 provides a signal on line 55 to call output circuitry 58, which provides isolation between the interface circuitry 50 and the E&M tie line module 40. The output signal from the call output circuitry 58 is then provided to the E connection 46 of the E&M tie line module 40 via channel 59. An E signal on the E&M tie line module 40 is reported to the telephone switchgear 20 via channel 26, and causes one or more designated telephones stations 22 to ring via the switchgear program. The switchgear 20 can be programmed to provide other alternative indications or signals in response to the presence of an E signal on the E&M module 40, as desired. For instance, the switchgear 20 could be programmed to light an indicator in addition to or as alternatives to causing ringing at the designated stations 22.

As mentioned above, once a telephone station 22 answers the call, such as by taking the phone off the hook or pressing a button or otherwise providing a signal or indication, an M signal is presented at the connection 48 of the module 40, resulting in a corresponding output signal over channel 53 from the call detection circuitry 52 to the controller 54. In the event of an E signal output on line 59 and an M signal input on line 51, the program of the microcontroller 54 produces an output which activates the switch 60, thereby allowing communication between the transmit lines 42 and 81, as well as between the receive lines 44 and 83. Accordingly, a drive-thru customer can utilize the intercom call button 34 to signal the telephone stations 22 via the interface circuitry 50, the E&M tie line module 40, and the switchgear 20, and the transmit and receive channels can be interconnected between the intercom system 30 and the E&M tie line module 40, allowing for full duplex communication between the intercom devices 32 and the telephone station 22, and minimizing the possibility of speech not being transmitted from one party to another.

Figure 2A:
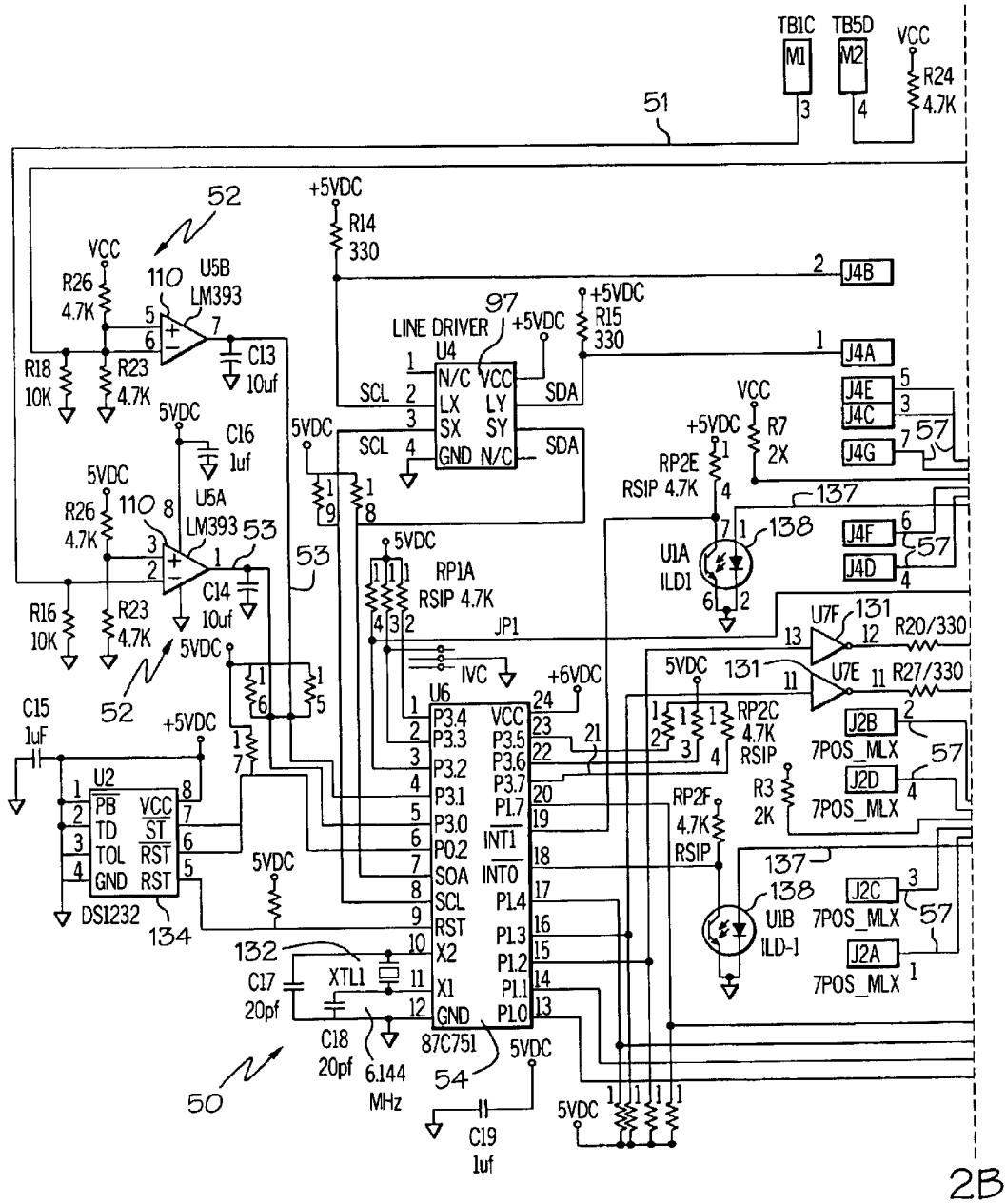
FIG. 2 is a circuit diagram illustrating exemplary interface circuitry which may be utilized in interfacing a telephone system and intercom system, according to principles of the present invention.
Figure 2B:
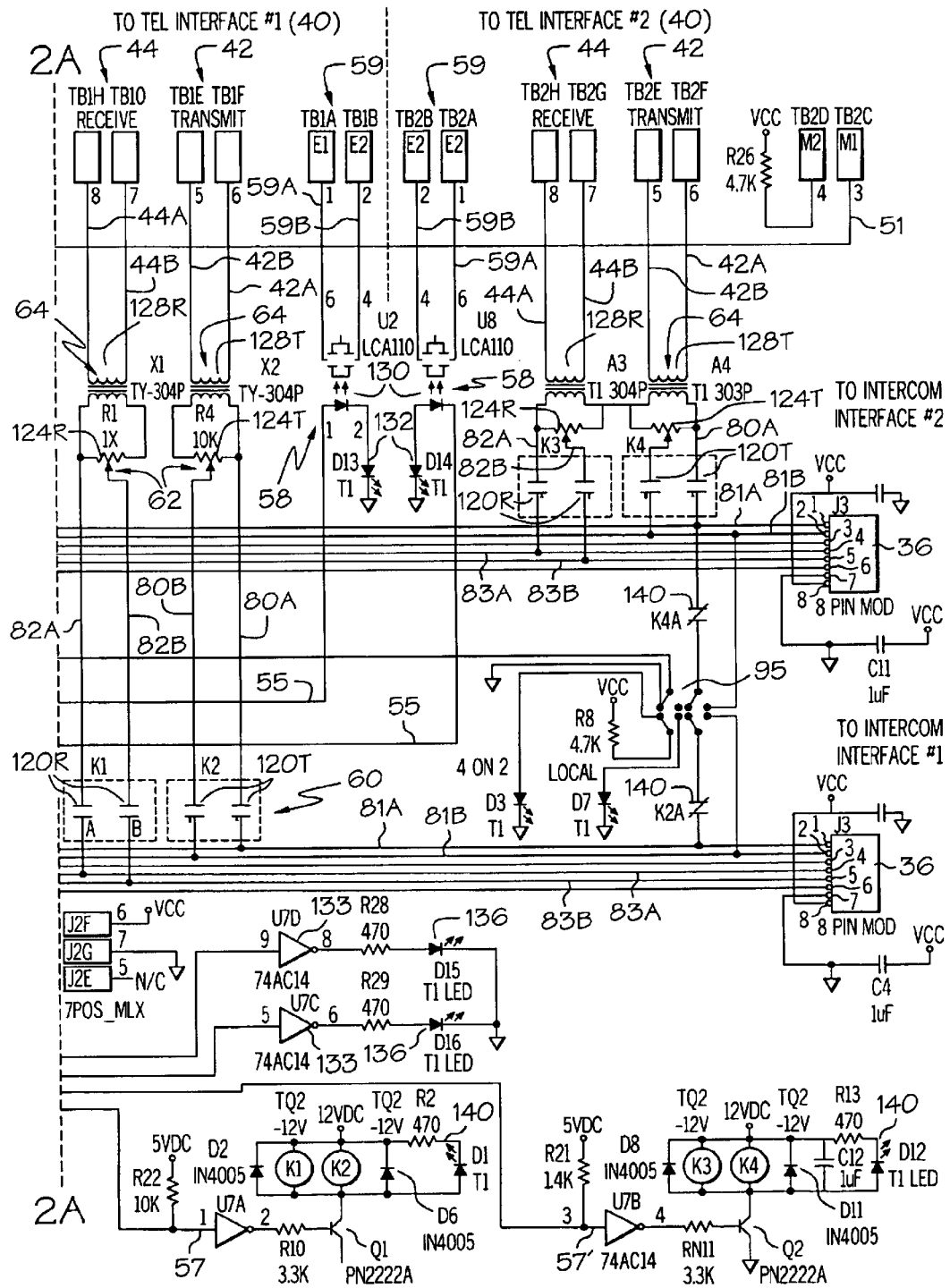

FIG. 2 illustrates exemplary components that could be utilized to manufacture the exemplary interface circuitry 50 of FIG. 1. In this example, connections are provided for two E&M modules, and connections to the intercom system are provided for two intercom stations. Accordingly, duplicate circuitry is shown for connecting the duplicated systems. However, operation will be described for one complete interface circuit with the understanding that the description is equally applicable to the other duplicate interface circuitry shown.

Specifically, in this exemplary embodiment, the call detection circuitry 52 includes a comparator 110 which receives the M signal from the tie line module. On a separate input, the comparator 110 receives a reference voltage which is taken between resistors R26 and R23, which connect between a voltage source Vcc and ground. Accordingly, the comparator 110 compares the M signal (which also connects to resistor R18 to ground) with the reference voltage, and provides a "no-call" output when the M signal is greater than the reference voltage and a "call output" when the M signal is less than the reference voltage. The output of the comparator 110 is provided to the logic controller 54, which comprises a microcontroller in the exemplary embodiment, as well as to a capacitor C14 which connects to ground. The comparator 110 may comprise an LM393 type comparator, or other suitable comparator devices or circuitry. Power and ground connections are also provided to the comparator 110.

Microcontroller 54 can comprise an 87C751 controller, although other circuitry, such as logic devices, controllers, processors and/or electronic components can be utilized. In addition to connecting to the comparators 110, the microcontroller 54 also connects to switching circuitry 60, which in the exemplary embodiment comprises relay switches 120R and 120T. Each relay switch 120T connects a transmit conductor 80A or 80B to a transmit conductor 81A or 81B from the intercom interface circuitry 36, and each relay switch 120R connects a receive conductor 82A or 82B to a receive conductor 83A or 83B from the intercom interface circuitry. Accordingly, in this example, the transmit channel comprises a pair of transmit conductors, and similarly, the receive channel comprises a pair of receive conductors. The relays 120R/120T are controlled by the microcontroller 54 which activates the relay state based upon whether certain call initiation events have been detected, as described above.

The output lines 82A and 82B from the relay switches 120R connect to level adjustment circuitry 62. In the exemplary embodiment of FIG. 2, the level adjustment circuitry 62 comprises a potentiometer 124R across lines 82A and 82B, and a potentiometer 124T across lines 80A and 80B. The resistance provided by the potentiometer can be adjusted, automatically or manually, to thereby adjust the gain of the transmit and/or receive lines. Connected in parallel with each potentiometer 124R is a transformer 128R, and connected in parallel with each potentiometer 124T is a transformer 128T. Accordingly, the transformer coupling 64 shown in FIG. 1 comprises transformers 128R and 128T in the exemplary embodiment of FIG. 2. These transformers 128R and 128T provide transmit and receive signal adjustment to the appropriate levels required for each of the telephone and intercom systems, and also prevents the possibility of any DC bias between the two systems.

Outputs from the microcontroller 54 are also provided to call output circuitry 58, which, in the exemplary embodiment of FIG. 2, includes an optocoupler 130. The microcontroller 54 is programmed to provide an output to the optocoupler 130 to signal the E&M tie module when the call signal is received from the intercom interface circuitry 36. An optocoupler 130 is utilized to provide this output in the exemplary embodiment, rather than a direct connection to the E&M tie line module, because some such modules may not be able to share a ground connection with the interface circuitry of FIG. 2. As known in the art, the optocoupler 130 can comprise a light emitting diode (LED) and a phototransistor. An input signal to the LED causes light to emit from the LED, which is sensed by the phototransistor, which in turn delivers an output signal of higher amplitude than that of the input signal. In the exemplary embodiment, the optocoupler 130 is connected to the output pin of the microcontroller 54 through an inverter 131.

The call signal from the intercom circuitry 36 can be provided to the microcontroller 54 through an optocoupler 138, to isolate the voltage levels between the microcontroller 54 and the intercom circuitry 36, and to reduce the possibility of noise signals interfering with the detection of a call signal from the intercom button.

Other circuitry can be provided as desired to implement the exemplary design of FIG. 2 and/or to provide other desired functions. For instance, a clock 132 can be provided to provide a clock signal to operate the controller 54. Moreover, a "watchdog" or monitoring circuit 134 can be provided to reset the microcontroller 54 if it is locked up or if it loses power. In the exemplary embodiment of FIG. 2, this circuit 134 comprises a DS1232 micromonitor chip. In addition, indicator lights, comprising light emitting diodes 136 can be provided and driven by the microcontroller 54 to indicate whether power is connected to the circuit of FIG. 2. Additional indicator lights, in the form of light emitting diodes 140 can be provided and driven by the microcontroller 54 (through inverters 133) to indicate the status of the relay switches 120R and 120T, and thus to indicate whether the transmit and receive lines from the intercom circuitry 36 are connected to the transmit and receive lines from the tie line module. Moreover, relay contacts 140 can be provided to short the input (transmit) lines 81B between the two intercom interface circuits 36 when the switch circuitry 60 is in the open state. This prevents stray electrical noise from being amplified over the intercom speakers when not in use. As shown in the exemplary circuit of FIG. 2, other components, such as resistors, capacitors, diodes, power signal and ground connections, connectors, invertors, transistors, and the like can be provided in the circuitry as needed and/or desired to implement a particular design.

As can be understood, many other components, configurations, and/or designs can be utilized in addition to or as alternatives to those of FIG. 2 according to the application desired. For example, rather than potentiometers, operational amplifiers, transformers, and/or other amplifiers could be utilized to adjust signal levels between the tie line module and intercom circuit. Moreover, rather than relay switches, transistor switching could be utilized to connect and/or disconnect transmit and receive lines. Accordingly, a wide variety of variations are possible for telephone to intercom interface circuitry 50, and FIGS. 1 and 2 are to be regarded as illustrative but not restrictive designs.

The exemplary circuitry of FIG. 2 can operate as follows. The comparator 110 recognizes the presence of an M signal on line 51 from the tie line module, and provides a call signal output to the microcontroller 54. The microcontroller 54 operates according to a program, which commands the microcontroller to provide an output to the optocouplers 130 (via inverters 131), which consequently provides a signal to the "E" connection of the E&M module. In such an event (the receipt of the M signal and the output of the E signal), the microcontroller 54 is also programmed to place the relays 120R and 120T in the closed state. Otherwise, the microcontroller 54 is programmed to place the relays 120R and 120T in an open state. Accordingly, the closing of the relays 120R and 120T connects the transmit and receive lines between the intercom circuit 36 and the tie line module. These transmit and receive lines are separate pairs of lines, in order to provide a full duplex system, and connect between the receive pair of lines through transformer 128R and potentiometer 124R, and between the transmit pair of lines through transformer 128T and potentiometer 128R. The transformers 128R and 128T, as well as the potentiometers 124R and 124T boost or lower the signals communicated on the transmit and receive lines, in order to adjust the signal to the levels needed by the telephone and intercom systems. As noted earlier, many drive-thru intercom systems require gain levels of 3 or more to properly communicate signals to and from the customer in the drive-thru lane. Once an M signal is no longer provided to the microcontroller 54 via comparator 110, the microcontroller ceases providing the E signal output to the inverter 131.

Signaling can also be provided from the intercom circuitry 36 to the microcontroller 54 to initiate a call. The call input device presents a call signal to the microcontroller 54 through the optocoupler 138. The microcontroller program recognizes this call signal and, in response, thereto, presents a signal on the line connected to the optocoupler 130. Accordingly, an E signal is provided to the tie line module 40, causing the telephones connected thereto to ring. Upon answering the telephone, the switches 120R and 120T are closed by the microcontroller 54, as described above, allowing the full duplex communication to be conducted.

The program of the microcontroller 54 can include a timing routine which begins counting after the initiation of an E signal. If the clock count reaches a predetermined value prior to a telephone station answering, then the E signal is terminated for a period of time before trying again. For instance, the E signal could be activated for one minute and then deactivated for ten seconds before being activated for another minute. This can be repeated a number of times, such as for five one-minute cycles for example. Also, to prevent a lockup of the system, it is desirable to delay the production of an E signal if a telephone station has hung up. For instance, upon recognizing a telephone station has hung up, the microcontroller 54 could count a predetermined time (e.g. five seconds) before permitting a call signal from the callbutton to activate the E signal.

Figure 3:
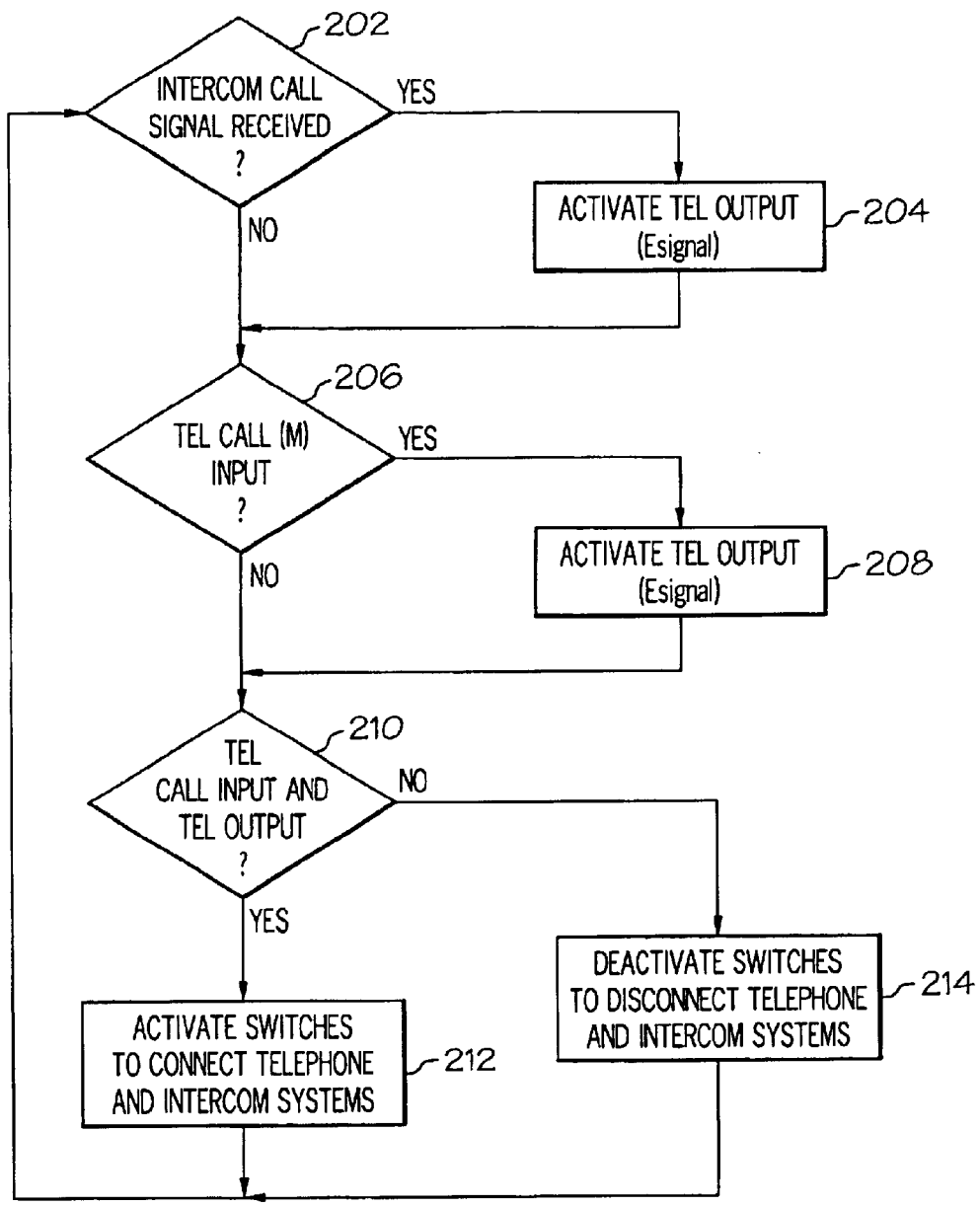
FIG. 3 is a flow diagram illustrating an exemplary programmed method of operation which may be utilized in interfacing telephone and intercom systems, according to principles of the present invention.

FIG. 3 is a flow diagram illustrating the operation a microcontroller for use in a telephone/intercom interface system, such as the microcontroller 54 of FIGS. 1 and 2 for example. Such operation can be achieved in a number of ways, such as by using a software or firmware program, such as can be stored as a series of instructions on a computer readable medium, or by providing a programmatic apparatus having executable instructions suitable for carrying out steps stored in a RAM, a ROM, and/or other memory units. Any of a variety of suitable circuitry, computers, processors, CPU's and/or controllers can be utilized for this purpose. In particular, at block 202, it is determined whether an intercom call signal has been received. If a call has been received from the intercom system, then an output is provided to the telephone system, as shown at block 204. If an E&M tie line module is utilized, then, at this step, a signal can be provided to the E input of the tie line module.

If it is determined at block 202 that an intercom signal has not been received, then the operation continues to block 206. Likewise, once the telephone output signal is provided at block 204, the process continues to block 206, where it is determined whether a telephone signal has been received from the telephone system. If an E&M tie line module is utilized, for instance, it can be determined whether an "M" signal has been received from the M output of the E&M module. If a telephone signal has not been received, then the process continues to block 210. If a telephone signal has been received, then the telephone output (e.g., a signal to the "E" port) is activated at block 208, before proceeding to block 210.

At block 210, it is determined whether a telephone call input (e.g., an "M" signal input) is being received and a telephone signal output (e.g., an "E" signal) is being provided. If so, then switches are activated to connect the telephone and intercom systems, as shown at block 212. (Preferably, separate receive lines are interconnected and separate transmit lines are interconnected). If not, then the switches are deactivated, so as to disconnect the telephone and intercom systems, as shown at block 214. As can be understood, the signals provided between the components described herein can comprise electrical signals of a particular amplitude (including 0 volts), frequency, or duration, or any other suitable optical, mechanical, electromagnetic, acoustic or other signal.

Figure 4:
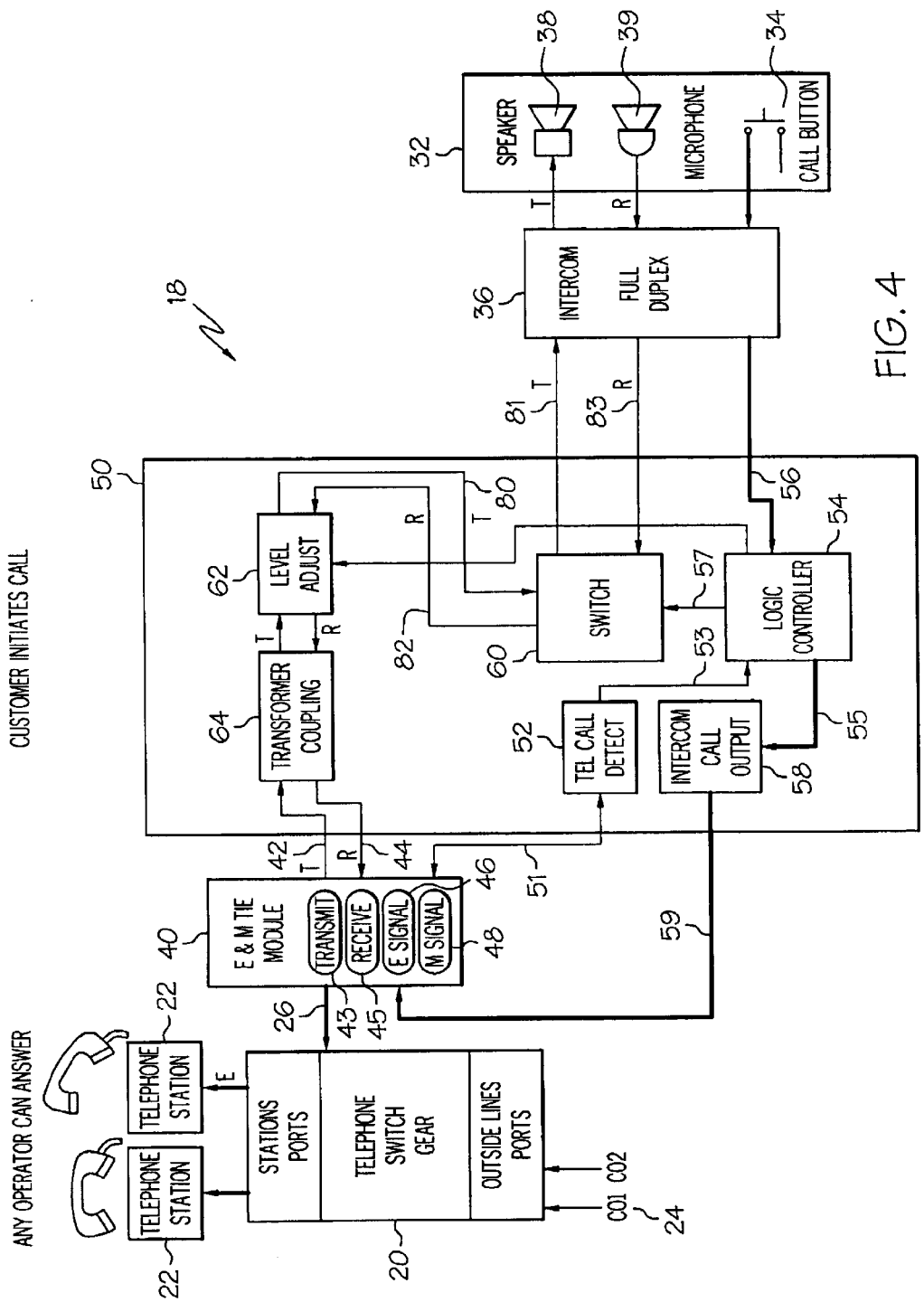
FIGS. 4–7 are schematic block diagrams illustrating an exemplary sequence of operation of the system of FIG. 1, according to principles of the present invention.

FIGS. 4–7 illustrate the preferred operation of the exemplary embodiment of FIG. 1, with the bold lines showing the passing of signals between the components. As shown in FIG. 4, depressing the call button 34 provides a signal on line 56 to the controller 54. In response to such a signal, the controller program causes the controller to provide an output on line 55 to the intercom call output circuitry 58, which, in turn, provides a signal to the "E" input connection 46 of the E&M module 40. The E&M module is programmed to recognize such inputs and to provide a signal over channel 26 to the telephone switch gear 20. (Alternatively, a signal could be provided directly to the stations 22.) In response to such a signal, the switchgear 20 provides a signal to one or more of the stations 22 (i.e., to the stations which are to receive intercom calls), in order to cause these stations to provide an indication to the user that an intercom call signal has been received. For example, the stations 22 could ring and/or illuminate a light in response to such a signal.

Figure 5:
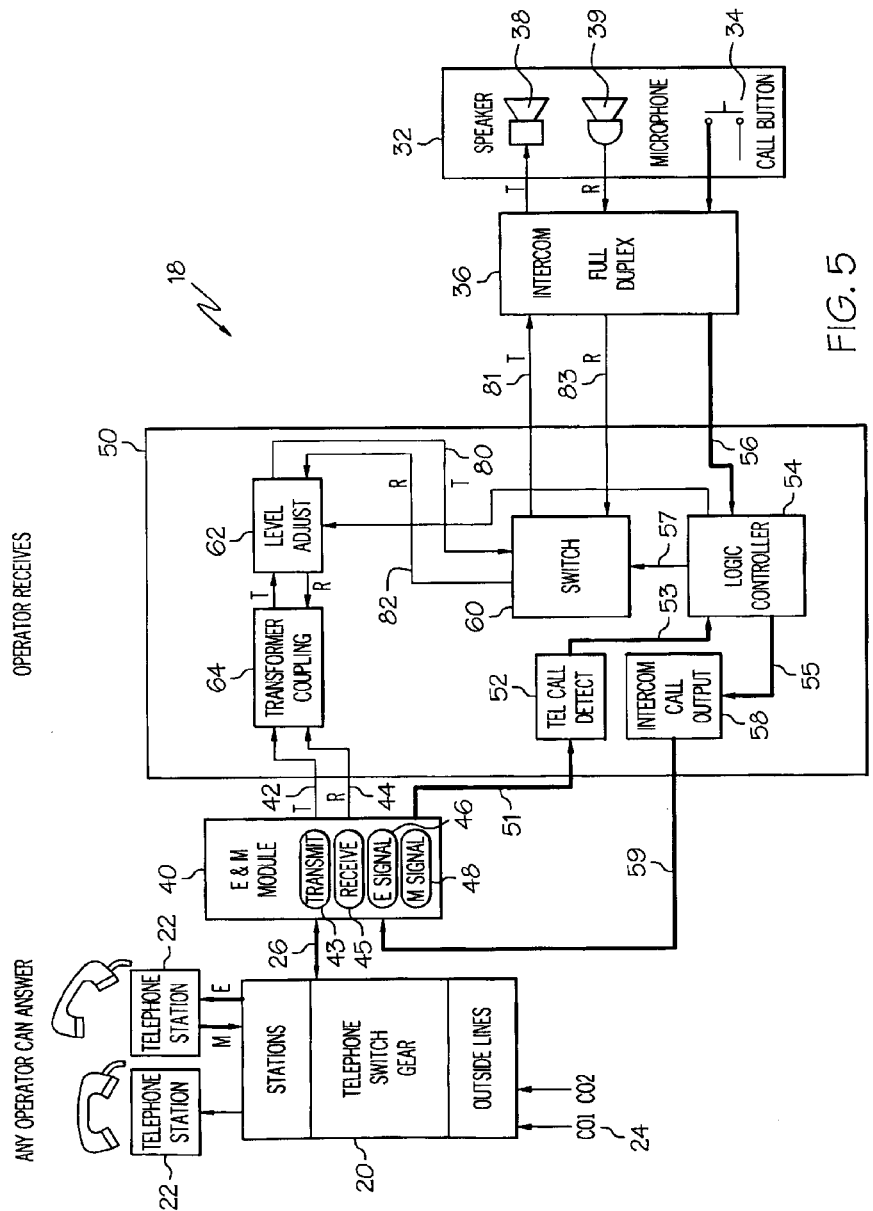

In FIG. 5, the operator at a telephone station 22 has answered the intercom call, such as by pressing a button or putting a headset in an "off the hook" condition. Such an action provides a signal to the telephone switchgear 20 which passes a corresponding signal to the E&M module 40. (Alternatively, the telephone stations 22 could directly provide a signal to the module 40). Consequently, the module 40 provides a signal on its output port 48 which is communicated over channel 51 to telephone call detection circuitry 52. In response to this input signal, the circuitry 52 provides a signal over line 53 to the logic controller 54.

Figure 6:
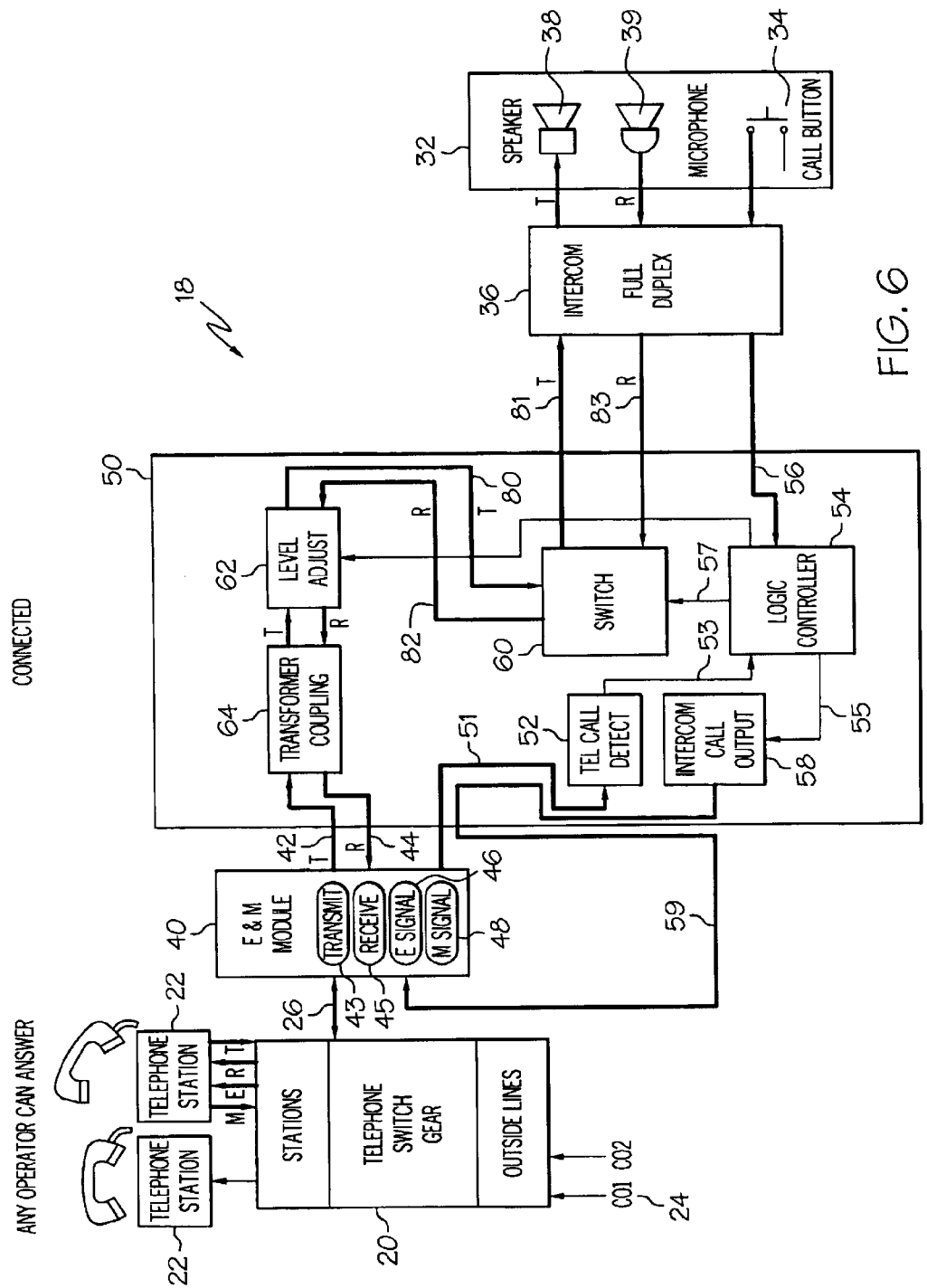

When a signal is received on line 53 and a signal is being provided on line 55, the microcontroller 54 will connect the intercom and telephone systems. This condition is shown in FIG. 6. In this condition, the microcontroller 54 provides a signal over channel 57 to switches 60 causing them to close. Consequently, transmit line 81 connects with transmit line 80, and receive line 83 connects with receive line 82. The transmit line 80 connects through the level adjustment circuitry 62 and the transformer coupling 64 to the transmit port 43 of the module 40. Likewise, the receive line 82 connects through level adjustment circuitry 62 and the transformer coupling 64 with the receive port 44 of the module 40. The station 22 can communicate, transmit and receive voice signals through the switchgear 20 and channel 26 to these ports 43 and 44. On the intercom side, transmit line 81 connects to speaker 38 through intercom interface circuitry 36, and receive line 83 connects to microphone 39 through circuitry 36. Accordingly, when the switch 60 is closed by the controller 54, a telephone operator, such as an employee, can speak into the transmitter of the telephone station 22 and the speech can be heard by an intercom user, such as a customer, via speaker 38. Likewise, the intercom user can speak into microphone 39 and be heard by the telephone user via the receiver in the telephone station 22.

The parties may speak at the same time without speech being lost, because separate, unconnected transmit and receive lines are provided (i.e., a full duplex system is provided). Also, as voice switches are not needed, parts of spoken words do not get truncated.

To terminate the call, the telephone operator at the station 22 can cease providing the M signal from the module 40, by placing the headset back on the hook (or pressing a button). When the M signal is no longer detected by circuitry 52, the logic controller 54 deactivates switch 60 to disconnect the transmit and receive lines. Upon termination of the call by the telephone operator, the controller 54 can also cease to provide the output over line 55 to the output circuitry 58 (until another call signal is received from either party).

Figure 7:
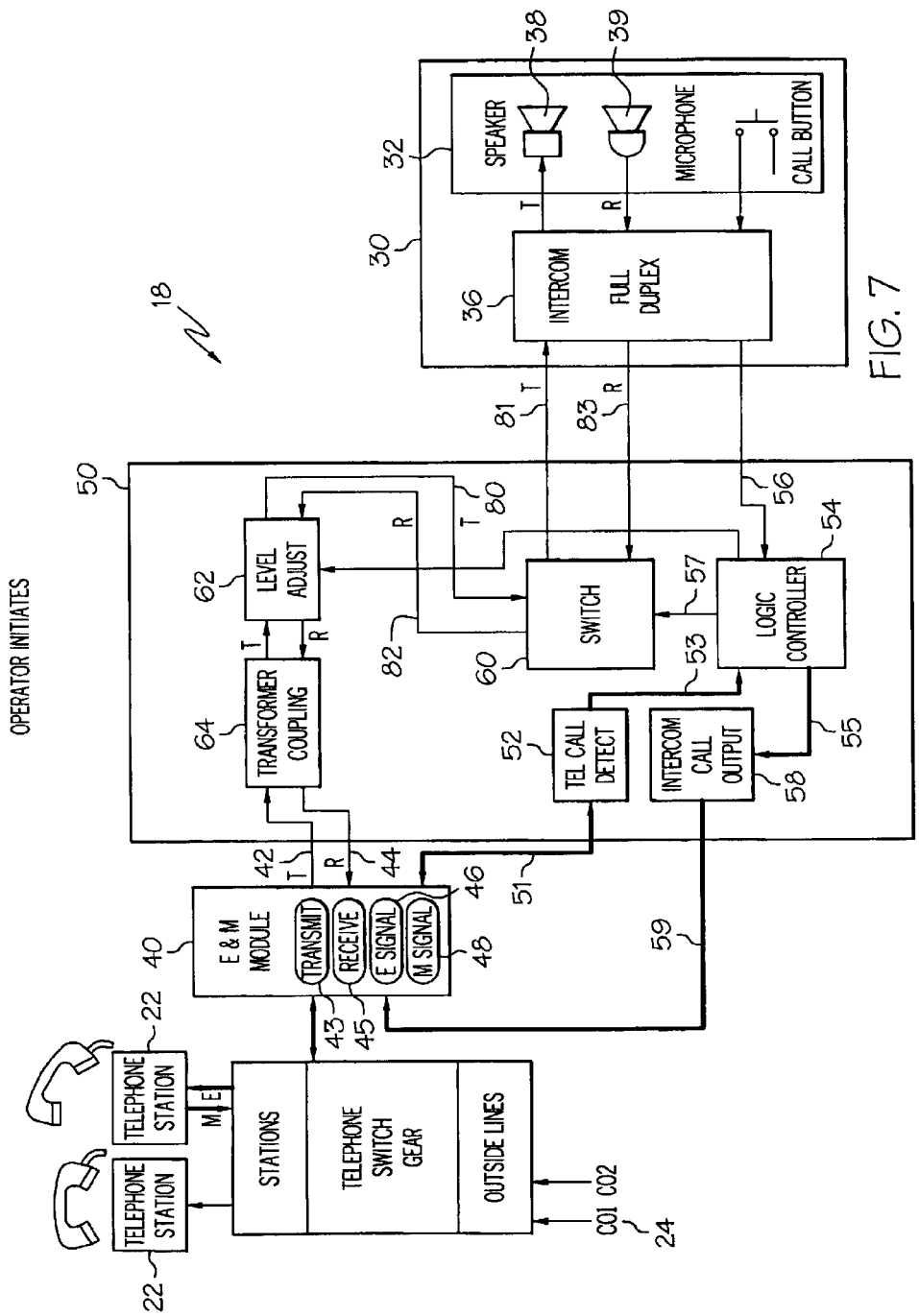

Calls can also be initiated by the telephone operator, as shown in FIG. 7. In the exemplary embodiment, a call can be placed to the intercom system 30 from a telephone station 22 by causing the E&M module 40 to generate an M signal at output port 48. The E&M module 40 can recognize a condition of the station 22, such as an off the hook condition or the pressing of a predetermined button, and can respond with a signal on output port 48. This signal is received by the telephone call detect circuitry 52 which relays the presence of this signal to the controller 54. In response, the controller 54 causes the call output circuitry 58 to provide a signal to the E input port 46 of the module 40, and then to cause the switch 60 to connect the transmit and receive lines, to allow full duplex communication between the telephone station 22 and the intercom devices 32.

Figure 8:
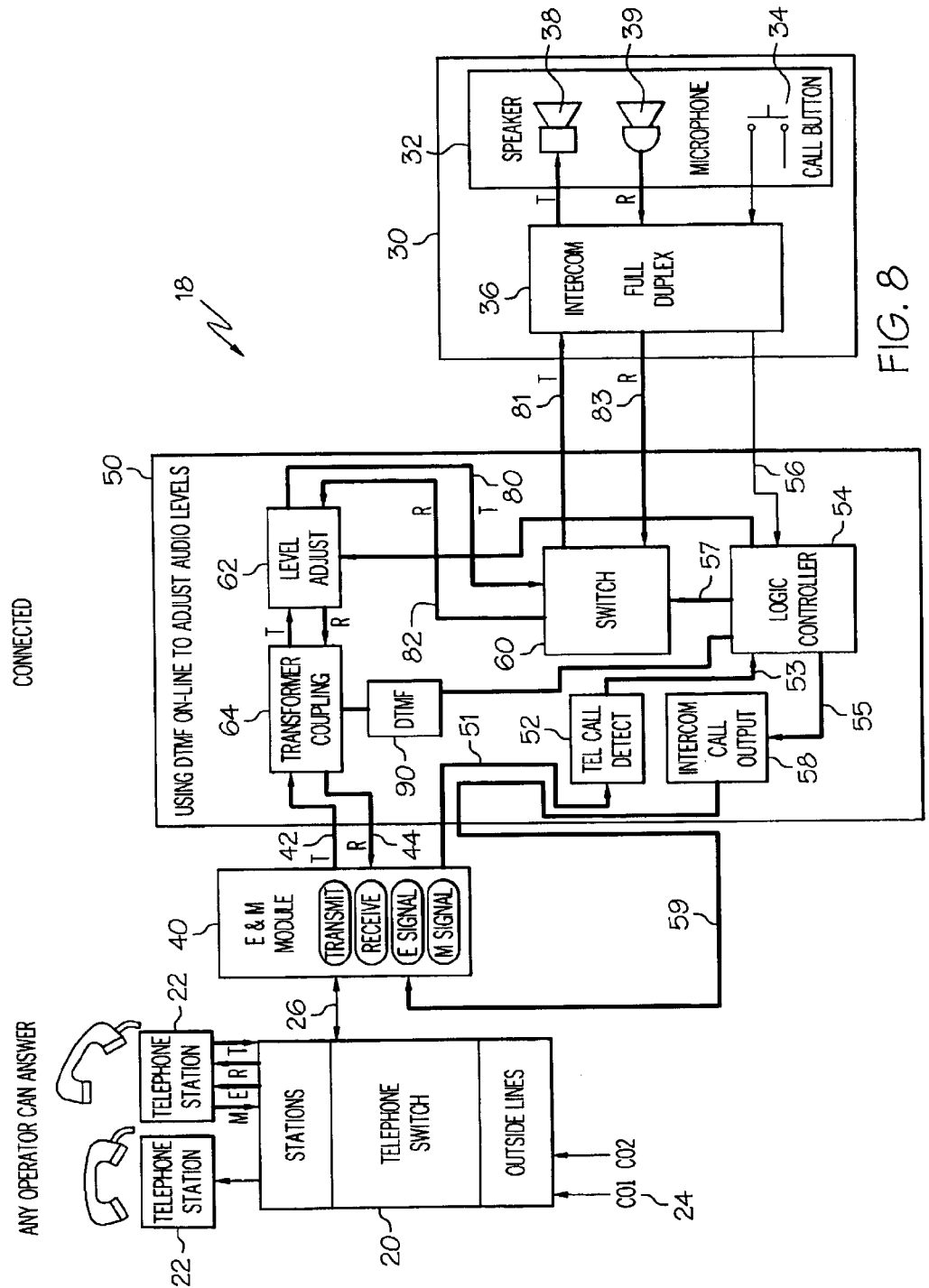
FIG. 8 is a schematic block diagram illustrating a system such as shown in FIG. 1 utilized with a tone detection device for adjusting voice signal levels, in accordance with principles of the present invention.

Other additional telephone, intercom, and/or communication capabilities, equipment, and functions can be provided as desired. For instance, as shown in FIG. 8, a dual tone multi-frequency (DTMF) receiver 90 is provided which can identify touch tones transmitted by the station 22. Tone generators can be provided at the stations 22, as are provided with touch tone telephones, to generate tones when desired, such as by pressing buttons at the stations. The tones can then be utilized to make adjustments to the operation of the circuitry. For instance, if a particular tone is recognized by the DTMF 90, it can signal the logic controller 54, which, in response, can adjust the gain adjustment circuitry 62, to modify the gain of audio signals being transmitted or received. A digital or electronic potentiometer can be utilized in the gain adjustment circuitry 62 to provide this remote volume adjustment. Such potentiometers can adjust resistance in response to signals from the controller 54, and thereby adjust the audio levels of the transmit and/or receive signals sent between the intercom and telephone devices. In one exemplary embodiment, the microcontroller 54 is sent different signals from the DTMF 90 for four different tones, one tone commanding the microcontroller to increase audio signals on the transmit lines, a second tone commanding the microcontroller to decrease audio signals on the transmit lines, a third tone commanding the microcontroller to increase audio signals on the receive lines, and a fourth tone commanding the microcontroller to decrease audio signals on the receive lines.

Figure 9:
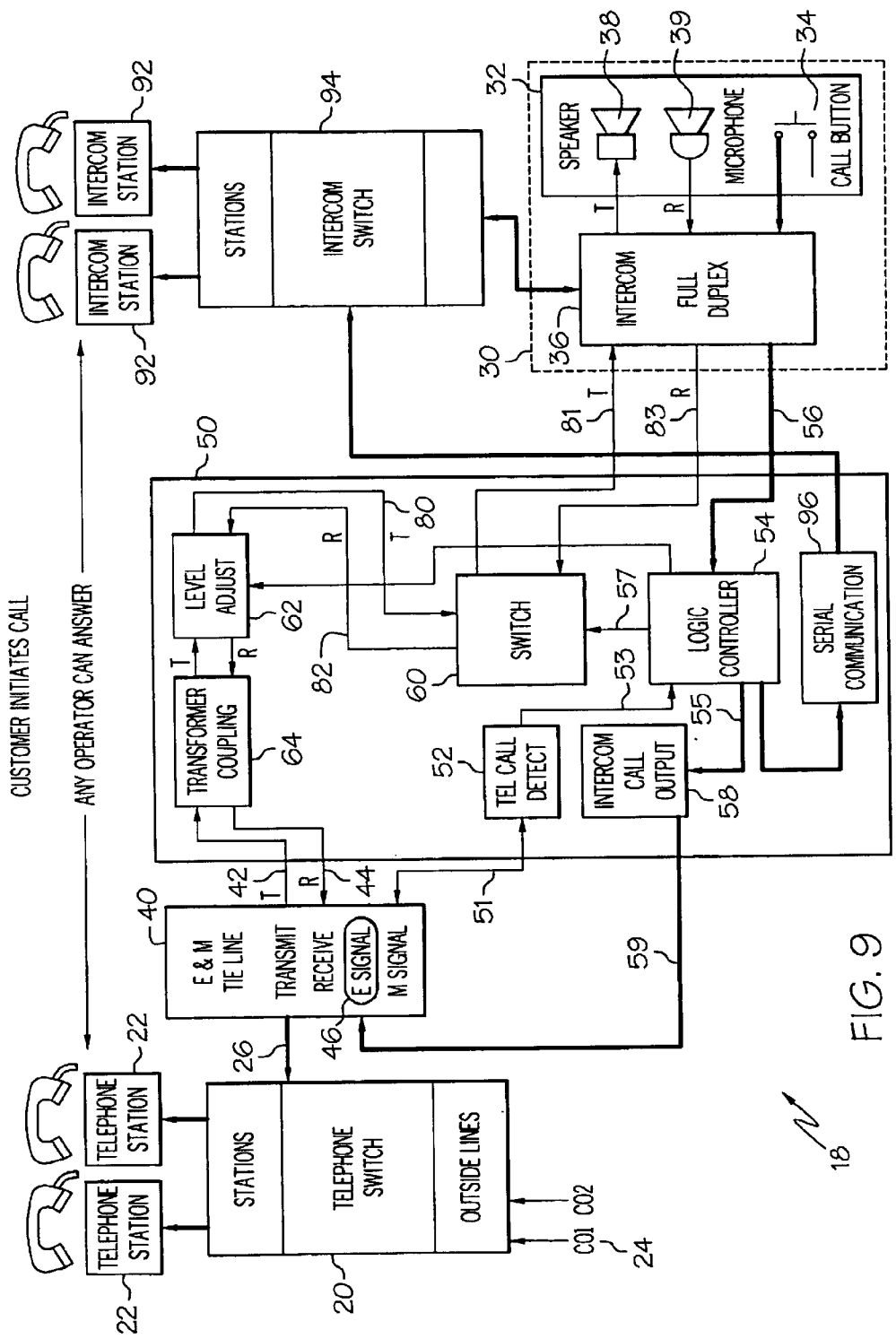
FIG. 9 is a schematic block diagram illustrating a system such as shown in FIG. 1 utilized in conjunction with additional interior intercom stations and related communication devices, according to principles of the present invention.

FIG. 9 provides another example of additional functionality that can be provided, if desired for a particular application. In this example, interior intercom stations 92, such as conventional intercom stations that do not have telephone capability, are connected to the exterior intercom system 30 via intercom switching circuitry 94. A serial communication circuit 96 can be utilized to allow the logic controller 54 to communicate with and control the intercom switch circuitry 94. In the exemplary embodiment of FIG. 2, this communication circuit comprises an 82B715 I2C bus extender integrated circuit 97. Using the communication circuit 96, the microcontroller can signal the intercom switch 94 when a call is received from the call button 34. If a telephone station 22 picks up on the call, then the microcontroller 54 can close switch 60 but keep the intercom stations 92 disconnected from the station 30. However, if an intercom station 92 picks up on the call, this condition is indicated to the controller 54 via the communication circuit 96, and the switch 60 is kept open while the intercom switch 94 connects the interior intercom stations 92 to the intercom station 30. Moreover, once an intercom station 92 picks up, the controller 54 also ceases providing the call signal to output circuitry 58, such that the telephone stations 22 cease ringing (or otherwise indicating that an intercom call is present). Different programming modes can be provided to accommodate for the presence of such additional stations 92. In the exemplary embodiment of FIG. 2, a switch 95 is provided to selectively provide a signal to the microcontroller to indicate whether an intercom switch is present, as in FIG. 9, or whether no such switch is present, as in FIG. 1.

The foregoing descriptions of the preferred embodiments of the invention have been presented for purposes of illustration and description only. They are not intended to be exhaustive or to limit the invention to the precise forms disclosed, and modifications and variations are possible and contemplated in light of the above teachings. While a number of preferred and alternate embodiments, methods, systems, configurations, components, and potential applications have been described, it should be understood that many variations and alternatives could be utilized without departing from the scope of the invention. For instance, the signaling connections, and communication described herein can be conducted using wired or wireless technology, as can the channels and lines illustrated. Moreover, the signals described can take any of a number of desired forms, and can change form during transmission, as noted above. Also, while a number of exemplary circuits and components thereof have been described, such circuits can take on a variety of forms and can be provided as integrated modules or units if desired.

Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Accordingly, it is intended that the scope of the invention be defined by the claims appended hereto.

What is claimed is:

1. An integrated telephone and intercom system, comprising:
    a plurality of telephone stations, each station having a telephone transmitter and telephone receiver;
    a private branch exchange switchgear circuit tying the stations with one another and with a central office telephone line of a public telephone company, wherein the private branch exchange switchgear circuit includes a single transmit/receive communication connection;
    an intercom station including an intercom speaker and an intercom microphone;
    a telephone interface comprising an E&M tie trunk module in communication with the telephone switchgear circuit, wherein the E&M tie trunk module includes a connection for communication with the single transmit/receive communication connection of the switchgear circuit and wherein the E&M tie trunk module includes a transmit output for a voice transmit signal and a receive input for a voice receive signal, wherein the transmit output is separate from the receive input such that the E&M tie trunk module separates the transmit and receive connection of the switchgear circuit such that transmit and receive paths are not connected, wherein the E&M tie trunk module further includes a mouth signaling connection port for initiating calls from the telephone stations and an ear signaling connection port for initiating calls from the intercom station;

intercom circuitry having a transmit input, a transmit output in communication with the intercom speaker, a receive output, and a receive input in communication with the intercom microphone; and an interface circuit connecting the transmit output of the E&M tie trunk module to the transmit input of the intercom circuitry over a transmit path, and separately connecting the receive input of the E&M tie trunk module to the receive output of the intercom circuitry over a separate receive path, the interface circuit comprising a signal level adjustment circuit configured to adjust audio signal levels communicated between the intercom circuitry and the E&M tie trunk module, the interface circuit further including signal isolation circuitry configured to isolate the transmit path and the receive path wherein the system provides full duplex communication between each telephone station and the intercom station.

2. The system as recited in claim 1, wherein the interface circuit further comprises:

a switching device configured to selectively connect the transmit output and the transmit input.

3. The system as recited in claim 2, wherein the interface circuit further comprises:

a switching device configured to selectively connect the receive input and the receive output.

4. The system as recited in claim 2, wherein the interface circuit further comprises:

a controller in communication with the switching device to provide switching signals thereto.

5. The system as recited in claim 1, wherein the telephone interface further comprises a call signal input and a call signal output.

6. The system as recited in claim 1, wherein the interface circuit comprises a telephone call detection circuit in communication with a signaling output on the telephone interface.

7. The system as recited in claim 1, wherein the signal level adjustment circuit comprises a potentiometer.

8. The system as recited in claim 1, wherein the interface circuit comprises a dual tone multi-frequency receiver.

9. The system as recited in claim 1, further comprising:

an interior intercom station; and an intercom switching circuit in communication with the interface circuit and the interior intercom station.

10. The system as recited in claim 1, wherein the interface circuit further comprises:

output circuitry in communication with the ear signaling connection port on the telephone interface.

11. The system as recited in claim 1, wherein the intercom station comprises a call button in communication with the interface circuit.

12. The system as recited in claim 1, wherein the intercom station further comprises a call button in communication with the interface circuit, wherein the telephone interface signaling ports are in communication with the interface circuit, wherein the interface circuit further comprises at least one switching device configured to selectively connect the receive input of the telephone interface with the receive output of the intercom circuitry and to selectively connect the transmit output of the telephone interface with the transmit input of the intercom circuitry, and wherein the interface circuit further comprises a controller in communication with the switching device to provide switching signals thereto.

13. An integrated telephone and intercom system, comprising:

a telephone station having a telephone transmitter and telephone receiver;

a private branch exchange switching circuit in communication with the telephone station and tying the station to a central office telephone line from a public telephone company, the switchgear circuit including a single transmit/receive communication connection;

a private branch exchange telephone interface in communication with the private branch exchange switching circuit, wherein the telephone interface includes a connection for communication with the single transmit/receive communication connection of the switching circuit, and wherein the telephone interface includes a transmit output for a voice transmit signal and a receive input for a voice receive signal, wherein the transmit output is separate from the receive input;

an intercom station including an intercom speaker and an intercom microphone; and an interface circuit connecting the private branch exchange telephone interface with the intercom station, the interface circuit having separate transmit and receive channels so as to provide full duplex communication between the telephone station and the intercom station the interface circuit further including signal isolation circuitry configured to isolate the transmit channel and the receive channel, the interface circuit further comprising a signal level adjustment circuit configured to allow separate adjustment of audio signal levels on the transmit channel and the receive channel.

14. The system as recited in claim 13, wherein the private branch exchange telephone interface comprises an E&M tie line module.

15. The system as recited in claim 13, wherein the interface circuit comprises a switching device to selectively interconnect the telephone station and the intercom station, and a controller to control the switching device.

16. An interface circuit for connecting a telephone system with a drive-thru intercom system, the circuit comprising:

a voice transmit channel for carrying voice signals from a telephone system to an intercom system;

a voice receive channel for carrying voice signals from an intercom system to a telephone system, wherein the voice receive channel is separate from the voice transmit channel so as to provide full duplex communication;

a switching device located along at least one of the voice transmit and voice receive channels;

a first gain adjustment circuit configured to allow for gain adjustment of the voice transmit channel;

a second gain adjustment circuit configured to allow for gain adjustment of the voice receive channel;

a first transformer coupling configured to provide adjustment of the voice transmit channel to the appropriate levels required for the connected telephone and intercom systems;

a second transformer coupling configured to provide adjustment of the voice receive channel to the appropriate levels required for the connected telephone and intercom systems; and a control circuit in communication with the switching device and configured to selectively apply signals to the switching device to selectively connect and disconnect the telephone system and the intercom system.

17. The interface circuit as recited in claim 16, wherein the switching device comprises a relay switch.

18. The interface circuit as recited in claim 16, wherein the gain adjustment circuits comprise potentiometers.

19. The interface circuit as recited in claim 16, wherein the controller is also in communication with the gain adjustment circuits to adjust signals transmitted along the voice transmit and voice receive channels.

20. The interface circuit as recited in claim 16, further comprising:

a call detection circuit configured to receive a telephone call input signal from a telephone interface device; and call output circuitry configured to provide an intercom call output signal to a telephone interface device.

21. The interface circuit as recited in claim 16, further comprising:

a serial communication circuit in communication with the controller and providing communication between the controller and an intercom switching device.

22. A method for connecting a telephone system with an intercom system, comprising:

accessing a private branch exchange telephone switching device including a single transmit/receive communication channel;

connecting a private branch exchange interface device to the single transmit/receive communication channel of the private branch exchange telephone switching device, wherein the private branch exchange interface device comprises an E&M tie trunk module configured to separate the single transmit/receive communication connection into separated transmit and receive channels;

connecting the E&M tie trunk module to an interface circuit, wherein the interface circuit is configured to isolate each of the transmit and receive channels between a telephone system and an intercom system, and wherein the interface circuit is configured to adjust the gains of the transmit and receive channels;

accessing a full duplex drive-thru intercom station; and connecting the interface circuit to the full duplex drive-thru intercom station.

23. The method as recited in claim 22, wherein private branch exchange interface device is connected to the interface circuit by the steps of:

connecting a signaling conductor between the private branch exchange interface device and the interface circuit;

connecting a voice transmit conductor between the private branch exchange interface device and the interface circuit; and connecting a voice receive conductor between the private branch exchange interface device and the interface circuit.

24. The method as recited in claim 22, wherein the intercom station is connected to the interface circuit by the steps of:

connecting a signaling conductor between the intercom station and the interface circuit;

connecting a voice transmit conductor between the intercom station and the interface circuit; and connecting a voice receive conductor between the intercom station and the interface circuit.

25. A method of interconnecting an intercom system with a telephone system, comprising:

determining whether an intercom call signal has been received from an intercom station;

if an intercom call signal has been received, causing the generation of an output signal in order to produce a call indicator at a telephone station;

determining whether a telephone call signal has been received in response to a condition of the telephone station; and if a telephone call signal has been received, providing a switch output signal to a switching device to close a voice transmission channel interconnecting the telephone station and the intercom station, wherein the output signal is provided to an E signal input of an E&M tie line module and wherein the telephone call signal comprises an M signal output of an E&M tie line module.

26. The method as recited in claim 25, wherein the switching device comprises a relay device.

27. The method as recited in claim 25, further comprising:

determining whether a level adjustment signal has been received; and if a level adjustment signal has been received, providing a control signal to a level adjustment circuit in order to adjust voice transmission signals on the voice transmission channel.

\* \* \* \* \*